United States Patent Office.

JAMES L. BAUMER, OF COLUMBUS, OHIO.

Letters Patent No. 97,857, dated December 14, 1869.

IMPROVED OIL-BLACKING FOR LEATHER.

The Schedule referred to in these Letters Patent and making part of the same.

To all whom it may concern:

Be it known that I, JAMES L. BAUMER, of Columbus, of the county of Franklin, and State of Ohio, have invented certain new and useful Improvements in Oil-Blacking for Leather; and I do hereby declare that the following is a full, clear, and exact description of the same.

The object of this invention is to produce a water-proof and preservative composition for leather.

The invention consists in the following ingredients, to wit:

Neat's-foot oil, five (5) parts.
Castor-oil, one (1) part.
Beef-tallow, one (1) part.
Oil of tar, one (1) part.
Ivory-black, one (1) part.
Oil of hemlock, one-eighth of ($\frac{1}{8}$ of one 1) part.
Beeswax, three sixty-fourths of one ($\frac{3}{64}$ of 1) part.
Rosin, three thirty-seconds of one ($\frac{3}{32}$ of 1) part.

The best method of preparing this compound, is as follows:

Boil the tallow, neat's-foot and castor-oils together, that any water they may hold will be evaporated; then add the rosin, powdered; then the beeswax; empty into a vessel, and add oils of tar and hemlock, lastly stirring in the ivory-black.

What I claim as my invention, and desire to secure by Letters Patent, is—

The within-specified composition as an oil-blacking for leather, mixed in the proportions substantially as set forth.

JAS. L. BAUMER.

Witnesses:
JOHN SMITH,
S. C. GOING.